(12) United States Patent
Arjona et al.

(10) Patent No.: US 11,684,980 B2
(45) Date of Patent: Jun. 27, 2023

(54) THREAD CUTTING INSERT (71) Applicant: CERATIZIT LUXEMBOURG S.A.R.L., Mamer (LU)

(72) Inventors: Sylvain Arjona, Mamer (LU); Fabien Axer, Mamer (LU); Marc Noel

(73) Assignee: CERATIZIT Luxembourg S.A.R.L., Mamer (LU)

( * ) Notice: Subject to any disclaimer, the term of this patent is extended or adjusted under 35 U.S.C. 154(b) by 103 days.

(21) Appl. No.: 17/252,561

(22) PCT Filed: May 13, 2019

(86) PCT No.: PCT/EP2019/062130
§ 371 (c)(1),
(2) Date: Dec. 15, 2020

(87) PCT Pub. No.: WO2019/238323
PCT Pub. Date: Dec. 19, 2019

(65) Prior Publication Data
US 2021/0252603 A1    Aug. 19, 2021

(30) Foreign Application Priority Data

Jun. 15, 2018    (EP) ...................................... 8177900

(51) Int. Cl.
*B23B 27/06* (2006.01)
*B23G 5/00* (2006.01)

(52) U.S. Cl.
CPC .............. *B23B 27/065* (2013.01); *B23G 5/00* (2013.01); *B23G 2200/10* (2013.01); *B23G 2200/24* (2013.01)

(58) Field of Classification Search
CPC ........ B23G 5/18; B23G 1/32; B23G 2200/10; B23G 2200/24; B23B 27/065; B23B 2215/68; B23B 2200/321
See application file for complete search history.

(56) References Cited

U.S. PATENT DOCUMENTS 2,668,401 A    2/1954  Reimschissel
3,466,721 A    9/1969  Binns
(Continued)

FOREIGN PATENT DOCUMENTS

CN    202622095 U    12/2012
DE    449137 C    9/1927
(Continued)

*Primary Examiner* — Boyer D Ashley
*Assistant Examiner* — Reinaldo A Vargas Del Rio
(74) *Attorney, Agent, or Firm* — Laurence A. Greenberg; Werner H. Stemer; Ralph E. Locher (57) ABSTRACT

A thread cutting insert for cutting threads includes a plurality of cutting teeth disposed along a cutting portion, each cutting tooth is provided with an allocated chip former, and the chip formers are provided on a rake face of the thread cutting insert. The shape of at least two cutting teeth is different from each other. At least one cutting tooth along the cutting portion is provided with an allocated chip former the shape of which is adapted to the shape of that cutting tooth which, with respect to an order of engagement during cutting operation, precedes the subsequent cutting tooth along the cutting portion such that the at least one chip former has a shape adapted to the cross-section of chips encountered by it. A set of at least two thread cutting inserts, a thread cutting tool and a method for cutting threads, are also provided.

15 Claims, 6 Drawing Sheets

(56) References Cited

U.S. PATENT DOCUMENTS

| | | | | |
|---|---|---|---|---|
| 4,572,713 | A | * | 2/1986 | Schmidt ................ B23B 27/065 407/113 |
| 5,549,424 | A | * | 8/1996 | Bernadic ............... B23B 27/065 407/100 |
| 8,210,777 | B2 | * | 7/2012 | Ishida ....................... B23C 5/06 407/66 |
| 2006/0024140 | A1 | * | 2/2006 | Wolff ....................... B23G 5/16 408/1 R |

FOREIGN PATENT DOCUMENTS

| | | | | |
|---|---|---|---|---|
| EP | 0718062 | A1 | 6/1996 | |
| GB | 365219 | A * | 1/1932 | ........... B23B 27/065 |
| GB | 365219 | A | 1/1932 | |
| RU | 2086365 | C1 | 8/1997 | |
| RU | 2214321 | C2 | 10/2003 | |
| SU | 55467 | A1 | 11/1938 | |
| SU | 887068 | A1 | 12/1981 | |
| SU | 1349113 | A1 * | 5/1991 | ............... B23G 5/06 |
| WO | WO-2019132349 | A1 * | 7/2019 | ............... B23G 1/22 |

\* cited by examiner

THREAD CUTTING INSERT

BACKGROUND OF THE INVENTION

Field of the Invention

The invention concerns a thread cutting insert for cutting threads, having a plurality of cutting teeth disposed along a cutting portion, each cutting tooth is provided with an allocated chin former, the chin formers being provided on a rake face of the thread cutting insert, and the shape of at least two cutting teeth is different from each other. The invention also concerns, a set of thread cutting inserts each thread cutting insert having a plurality of cutting teeth, each cutting tooth is provided with an allocated chip former, the chip formers being provided on a rake face of the respective thread cutting insert, the thread cutting inserts are to be mounted to holders such that in order of their engagement during cutting operation cutting teeth disposed on different thread cutting inserts follow each other in operation, and the shape of at least two cutting teeth disposed on different thread cutting inserts is different from each other and the invention concerns a thread cutting tool with such a thread cutting insert or such a set of thread cutting inserts. Protection is further sought for a method for cutting threads.

A thread cutting insert (also known as thread chaser) according to the prior art is shown, for example, in EP 0 718 062 A1 and CN 202622095 U.

In the case of generic thread cutting inserts, more than one cutting tooth is formed on one thread cutting insert. In use, a cutting tooth is followed by a subsequent cutting tooth, wherein said subsequent tooth usually widens and/or deepens the groove created by the previous cutting tooth.

A chip former is a structure being placed alongside the cutting edge opposite to the direction the cutting tooth is entering a material to be threaded. It is arranged on the rake face of the thread cutting insert. Its function is to guide and optionally deflect a chip created by the cutting tooth at the cutting edge in front of it.

SUMMARY OF THE INVENTION

The purpose of the invention is to provide an improved thread cutting insert, an improved set of thread cutting inserts and an improved thread cutting tool. In particular, an aim is to improve the cutting and chip evacuation performance of the thread cutting insert, the set of thread cutting inserts and the thread cutting tool, respectively.

This is being achieved by a thread cutting insert in which at least one cutting tooth along the cutting portion is provided with an allocated chip former the shape of which is adapted to the shape of that cutting tooth which, with respect to an order of engagement during cutting operation, precedes the subsequent cutting tooth along the cutting PORTION such that the at least one chip former has a shape adapted to the cross-section of chips encountered by it. It is also achieved by, a set of thread cutting inserts with the features of the corresponding claim and a thread cutting tool with the features of the corresponding claim. Embodiments of the invention are defined in the dependent claims.

"Shape" means "contour" or "course" in top view (view in which the rake face is visible and the rake face is parallel to the view plane). Therefore, the definition that "the shape of a chip former essentially corresponds to the shape of a certain cutting tooth" means that a contour of said chip former is essentially the same as the contour of the cutting edge of said cutting tooth, both as seen in a top view of the thread cutting insert.

The term "subsequent" is being used as meaning "following each other".

"Feed direction" is the axial direction in which the thread cutting insert(s) is or are moved during cutting operation relative to the body or material in which the thread is to be cut. Of course, there is also rotative relative motion between the thread cutting insert(s) and the body or material in which the thread is to be cut such that the combination of motion in feed direction and rotative motion results in a helical path of the thread cutting insert(s).

Both, generic and inventive thread cutting inserts, are used in such a way that the cutting teeth do not make first contact with the body or material in which the thread is to be cut all at the same time but they are intended to make first contact one after the other as each cutting tooth except the very first cutting tooth is supposed to work on the groove cut by the preceding cutting teeth. "Order of engagement during cutting operation" means the sequence in which the cutting teeth make first contact with the body or material to be cut.

According to the invention, at least one cutting tooth along the cutting portion is provided with an allocated chip former the shape of which is adapted to the shape of that cutting tooth which with respect to the order of engagement during cutting operation precedes the subsequent cutting tooth along the cutting portion (for short: "previous tooth") such that the at least one chip former has a shape adapted to the cross-section of chips encountered by it. A major advantage of the invention is to lower the cutting force by facilitating chip flow over the chip former.

The cross-section of the chips encountered by a chip former depends:
- on the shape of the groove formed by the previous tooth and
- on the shape of the cutting tooth the chip former is allocated to because a cutting tooth has to remove more material at positions along its cutting edge where the previous tooth has removed less material and vice versa.

According to the prior art, a chip former has a shape corresponding essentially to the shape of the cutting tooth it is allocated to. Usually, its contour just follows the shape of the corresponding cutting tooth.

However, with respect to the invention, for the shape of the chip former of a (subsequent) tooth, the shape of the previous tooth is also accounted for. In other words, in the design of a chip former of an actual tooth, the shape of the previous (in order of engagement) tooth is considered.

This has the advantageous effect that the required cutting force is lowered because it is easier for a chip to flow over a chip former which has a shape adapted to the cross-section of the chip in such a way that
- where the cross-section's thickness of the chip is large because the cutting tooth the chip former is allocated to must cut more material (as the previous tooth has removed less material) the chip former leaves more space for the chip and
- where the cross-section's thickness of the chip is small because the cutting tooth the chip former is allocated to must cut less material (as the previous tooth has removed more material) the chip former leaves less space for the chip, resulting in a better chip removal by orienting the flow of the chips without increasing cutting forces as much as with prior art solution.

An "adapted" chip former shape means that in the chip former shape of an actual tooth, the shape of the previous (in order of engagement) tooth is considered. Further, at positions where the chip cross-section thickness is large, a distance between the cutting edge and the corresponding chip former is larger than at positions where the chip cross-section thickness is smaller. In that way, the chip former has a shape adapted to the cross-section of chips encountered by it.

As the cross-section thickness of a chip created by a tooth may well be not uniform but varying along its breadth, the distance between the cutting edge and the corresponding chip former may accordingly vary, that is, being not constant, meaning the chip former contour being not necessarily parallel to the corresponding cutting edge.

A better chip removal is achieved by avoiding the chips to remain straight and by orienting their flow (in particular when it comes to long chips which are not intended to be broken).

With respect to a set of at least two thread cutting inserts at least one cutting tooth of a specific thread cutting insert is provided with an allocated chip former the shape of which essentially corresponds to the shape of that cutting tooth which is arranged on a thread cutting insert that in operation precedes the specific thread cutting insert with respect to order of their engagement during cutting operation such that the at least one chip former has a shape adapted to the cross-section of chips encountered by it. The advantage of using a set of at least two thread cutting inserts over the use of a single thread cutting insert is that the cutting forces are distributed over the multiple thread cutting inserts present.

If not expressly stated otherwise all statements refer to both a single thread cutting insert and a set of at least two thread cutting inserts.

It can be provided that the shape of the chip former allocated to the first cutting tooth is related to the shape of the body or material to be threaded, e. g. to the cross-section of the material to be cut.

While the shape of a certain chip former allocated to a certain cutting tooth corresponds to the shape of that cutting tooth which with respect to an order of engagement during cutting operation precedes the certain cutting tooth along the cutting portion, the height and/or width of the certain chip former can correspond to that cutting tooth the chip former is allocated to.

With respect to a single thread cutting insert as defined according to the invention "order of engagement during cutting operation" corresponds to the way the cutting teeth are physically disposed on the thread cutting insert opposite to a feed direction, i. e., an axial direction in which the thread cutting insert is moved relative to the body or material in which the thread is to be cut during rotation of the thread cutting insert relative to the body or material. The first cutting tooth to engage the body or material in which the thread is to be cut is that cutting tooth which opposite to the feed direction comes first.

With respect to a set of at least two thread cutting inserts as defined according to the invention "order of their engagement during cutting operation" corresponds to the way the cutting teeth enter the body or material in which the thread is to be cut. I. e., in contrast to the single thread cutting insert, where there is a physical order along the cutting edge of the single thread cutting insert, here the order of engagement of cutting teeth disposed on different thread cutting inserts is defined by the sequence according to which the cutting teeth enter the body or material in which the thread is to be cut. By way of example, if a set of three thread cutting inserts is to be used, during operation a first cutting tooth of a first thread cutting insert is to be followed by a first cutting tooth of a second thread cutting insert which is followed by a first cutting tooth of a third thread cutting insert which is followed by a second cutting tooth of the first thread cutting insert and so on.

With respect to the set of thread cutting inserts at least one cutting tooth along the cutting portion of a specific thread-cutting insert is provided with an allocated chip former the shape of which essentially corresponds to the shape of that cutting tooth which is arranged on a thread cutting insert that in operation precedes the specific thread cutting insert with respect to order of engagement of the cutting teeth during cutting operation such that the at least one chip former has a shape adapted to the cross-section of chips encountered by it.

With respect to both, a single inventive thread cutting insert and an inventive set of thread cutting inserts, the same inventive concept is realized namely that chip formers have a shape adapted to the cross-section of chips encountered by them thus improving the cutting and chip evacuation performance of the thread cutting insert and the set, respectively.

The shape of chip formers of the invention is essentially adapted to the cross-section of the chips encountered by them, which shall be explained in more detail in the following: The shape, in particular the cross-section, of a chip depends not only on the shape of the cutting tooth the chip former is allocated to but also on the shape of the groove formed by the cutting tooth which in order of engagement during cutting operation precedes the cutting tooth the chip former is allocated to. It can be understood that a subsequent tooth has to remove more material at positions along its cutting edge where the previous tooth has removed less material.

A resulting chip thus usually is not uniform in cross-section (e.g. rectangular) but rather has a cross-section with varying thickness.

Applicant has found that by adapting the chip formers to the cross-section of chips encountered by them the cutting performance of the thread cutting insert and the set of thread cutting inserts, respectively, can be improved.

Preferably, the shape of more than two cutting teeth, possibly of all of the cutting teeth, is different from each other. This applies to both, a single thread cutting insert and a set of at least two thread cutting inserts. In the latter case, the differently shaped cutting teeth are arranged on different thread cutting inserts. Of course, also with respect to a specific thread cutting insert of a set of at least two thread cutting inserts the shape of more than two cutting teeth, possibly of all of the cutting teeth, can be different from each other.

In an advantageous embodiment of the invention it is provided that each of the cutting teeth being subsequent to a first cutting tooth is provided with an allocated chip former the shape of which essentially corresponds to the shape of that cutting tooth which with respect to the order of engagement during cutting operation precedes the subsequent cutting tooth along the cutting portion such that each chip former allocated to a cutting tooth being subsequent to the first cutting tooth has a shape adapted to the cross-section of chips encountered by it. Best results are achieved by providing all cutting teeth (except the first one) with such chip formers.

In an advantageous embodiment of the invention it is provided that the heights and/or widths of cutting teeth along the cutting portion increase(s) with respect to the order of engagement during cutting operation. "Height" is the dimension in a plane comprising the rake face and being perpendicular to the feed direction of the thread cutting insert. "Width" is the dimension in a plane comprising the rake face and being perpendicular to the height. By this, the cutting forces are evenly distributed over the whole cutting portion as each cutting tooth widens and/or deepens the groove created by the previous cutting tooth.

It can be provided that the rake face is formed as a flat surface. Elevated structures can protrude from the flat surface of the rake face. E. g., in an advantageous embodiment of the invention it is provided that the chip formers are formed as elevations arranged on the rake face of the thread cutting insert. The advantage of having an elevated chip former unlike having a groove-shaped chip former as seen in CN 202622095 U is that its shape (in a view from the top of the thread cutting insert) can be designed or adjusted without affecting the chip formation and chip flow before the chip reaches the chip former.

In an advantageous embodiment of the invention it is provided that the chip formers are distanced from a cutting edge of the cutting portion or, alternatively, a portion of least one of the chip formers reaches the cutting edge of the cutting portion. Of course, in that portion of the chip former that reaches the cutting edge there is no chip forming and no showing part of the rake face.

"Flank of a chip former" is that portion of a chip former which extends between a top face of the thread cutting insert and the rake face of the thread cutting insert. Usually, the flank is a small portion of the chip former and runs along the cutting edge. In an advantageous embodiment of the invention it is provided that the chip formers are formed with flanks of a flat shape. Of course, alternatively, the chip formers can be formed with flanks of a curved shape.

A thickness of at least one of the chip formers, preferably of all of the chip formers, can be chosen in a range of 0.2-1.2 mm, preferably in a range of 0.4-0.8 mm.

In a top view a distance between a cutting edge and the flank of the related chip former, preferably with respect to all of the chip formers, can be chosen in a range of 0.1-1.1 mm, preferably in a range of 0.3-0.6 mm. This distance can be adjusted according to a chip thickness encountered. E. g., for a thick chip the distance should be chosen larger than for a thin chip.

An inclination angle of the flank measured between the rake face and the flank of at least one of the chip formers, preferably of all of the chip formers, can be chosen in a range of 30°-60°, preferably 45°.

In an embodiment of the invention it can be provided that an inclination angle or a radius of curvature of the flank of the chip formers changes along an extension of the chip formers leading to a twisted flank. This allows to change the deflection direction of the chips without changing the shape of the chip formers.

In an embodiment of the invention the thread cutting insert is provided with a clearance angle. If the thread cutting insert is not provided with a clearance angle, or in order to add to a clearance angle provided by the thread cutting insert, it is possible to tilt the thread cutting insert with respect to the body or material to be cut during operation.

Preferably, the shapes of a at least a pair of subsequent cutting teeth are geometrically not similar. The term "similar" here is used in a geometrical sense, that is, a shape of an individual tooth cannot be scaled such that it coincides with a shape of a previous or subsequent tooth. The present invention works best for dissimilar tooth shapes, as the invention is directed to adapt the shape of a chip former to the shape of a cutting tooth which with respect to an order of engagement during cutting operation precedes the subsequent cutting tooth. With dissimilar tooth shapes, chips with non-uniform cross section thickness are obtained, which further promotes cutting performance and chip evacuation. Non-uniform cross-section thickness of a chip means that a chip created by a tooth has a varying thickness along its breadth.

Protection is sought for a method for cutting threads, wherein at least one thread cutting insert according to at least one of the claims is employed such that a cutting tooth with respect to the order of engagement is followed by a cutting tooth a chip former the shape of which chip former is adapted to the shape of the respective preceding cutting tooth such that the shape is adapted to the cross-section of chips encountered by it.

Embodiments of the invention are shown in the figures:

DETAILED DESCRIPTION OF THE INVENTION

Figure 1A:
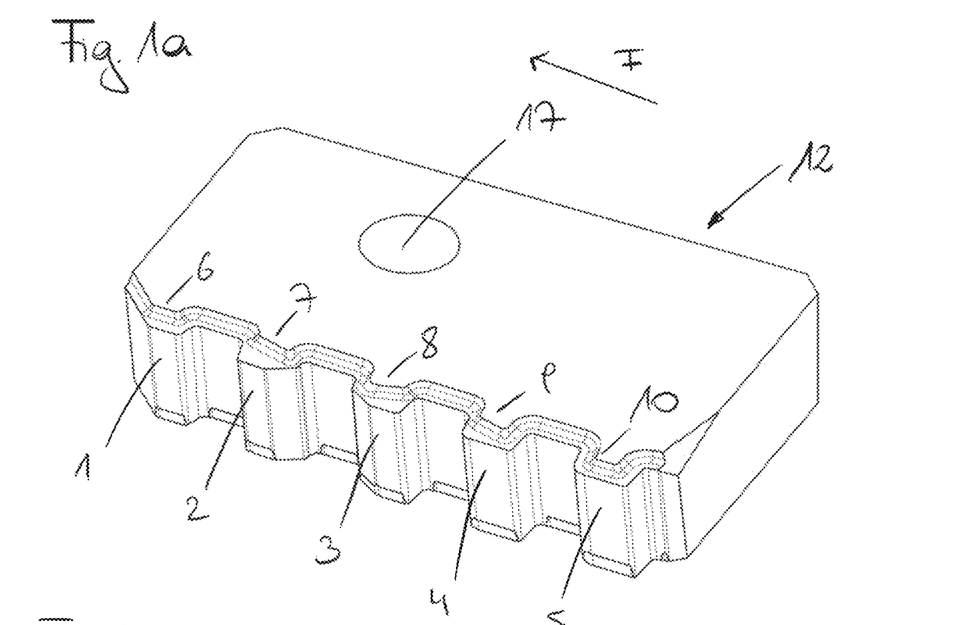
FIG. 1a,b a perspective view of a thread cutting insert according to the invention and a zoom into a detail of the thread cutting insert FIG. 2a-d a top view (FIG. 2a) and a side view (FIG. 2b) in European projection and two zooms (FIG. 2c,d) into a detail of the thread cutting insert of FIG. 1a,b FIG. 3 a thread cutting insert according to FIGS. 1a,b and 2a-d mounted to a holder FIG. 4 a cross-sectional view of a coupling for pipes with an internal thread being cut by a thread cutting insert of the previous figures FIG. 5 a perspective view of a pipe with an external thread being cut with a set of three thread cutting inserts FIG. 6 a detailed view of the threading action of FIG. 4

FIGS. 1a,b and 2a-d show a thread cutting insert 12 having five cutting teeth 1, 2, 3, 4, 5 arranged along a cutting portion. Arrow F denotes a feed direction of the thread cutting insert 12. The hole 17 shown in FIGS. 1 and 2 can be used to transport cooling fluid.

Figure 1B:
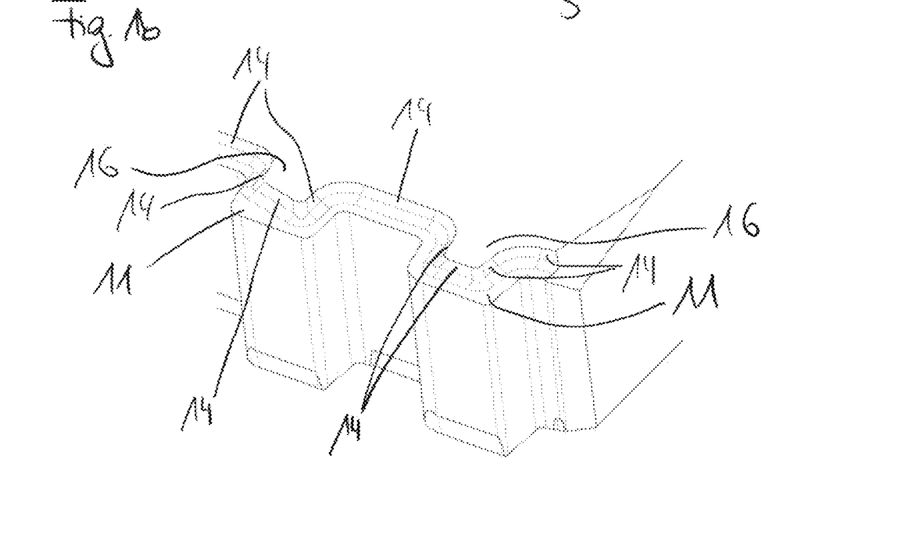
Figure 2A:
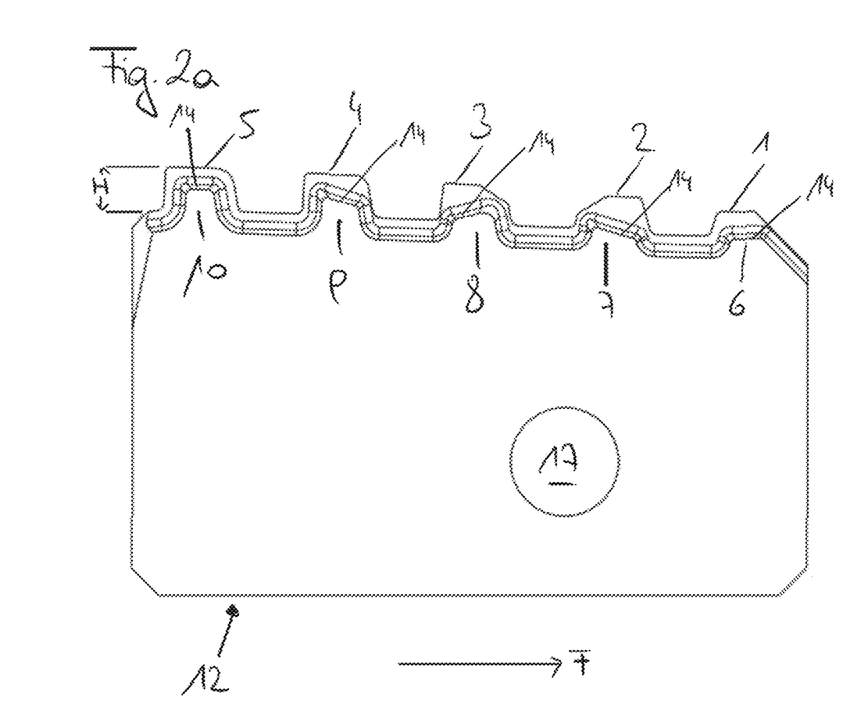

The first cutting tooth 1 is the first cutting tooth 1 with respect to an order of engagement during cutting operation, the second cutting tooth 2 is the second cutting tooth 2 with respect to an order of engagement during cutting operation and so on. The first to fourth cutting teeth 1, 2, 3, 4 have shapes that differ from each other. In the present embodiment, the fifth cutting tooth 5 has a shape which is identical to the one of the fourth cutting tooth 4 but differs from the fourth cutting tooth 4 in that is has a larger height H and width.

Each cutting tooth 1, 2, 3, 4, 5 is provided with an allocated chip former 6, 7, 8, 9, 10 in the form of elevations arranged on a rake face 11 of the thread cutting insert 12.

The chip formers 6, 7, 8, 9, 10 are mostly distanced from a cutting edge of the cutting portion, however there are portions of the chip former 6 allocated to the first cutting tooth 1 and of the chip former 9 allocated to the fourth cutting tooth 4 which adjoin the cutting edge.

The second to fifth cutting teeth 2, 3, 4, 5 along the cutting portion are provided with allocated chip formers 7, 8, 9, 10 the shape of which essentially correspond to the shape of that cutting tooth 1, 2, 3, 4 which with respect to the order of engagement during cutting operation precedes the subsequent cutting tooth 2, 3, 4, 5 along the cutting portion such that the chip formers 7, 8, 9, 10 allocated to the second to fifth cutting teeth 2, 3, 4, 5 have a shape adapted to the cross-section of chips encountered by them.

It can be seen that the heights H of cutting teeth 1, 2, 3, 4, 5 along the cutting portion increase with respect to the order of engagement during cutting operation (opposite to feed direction F).

There is a sequence of three adjacent teeth 2, 3, 4 with allocated chip formers 7, 8, 9 the chip former 8 of the subsequent cutting tooth 3 of the sequence—with respect to the order of engagement during cutting operation—has a shape which is essentially a mirror shape of the chip former 7 of the preceding cutting tooth 2 and the chip former 9 has a shape which is essentially a mirror shape of the chip former 8 of the preceding cutting tooth 3. As can be seen, chip former 7 is slanted to the right, chip former 8 is slanted to the left and chip former 9 is again slanted to the right. These shapes are related to the truncation of cutting teeth 1, 2, 3. Of course, this design (there being truncations) is not essential for the invention. However, if there are truncations, then it is essential to the invention that if the previous tooth is slanted to the right, then the chip former allocated to the cutting tooth next in line must be slanted to the right too because only in this case it can be provided that where the cross-section's thickness of the chip is large the chip former encountering this chip leaves enough space for the chip.

However, it is not necessary that cutting teeth have truncations.

The shape of the chip former 6 allocated to the first cutting tooth 1 is related to the shape of the body or material to be threaded, namely to the cross-section of the body or material to be cut. The shape of the chip former 10 allocated to the fifth cutting tooth 5 is related to the shape of the fourth cutting tooth 4.

That portion of a chip former 6, 7, 8, 9, 10 which extends between a top face 16 of the thread cutting insert 12 and the rake face 11 of the thread cutting insert 12 and runs along the cutting edge is called flank 14. Usually, the flank 14 is only a small portion of the chip former 6, 7, 8, 9, 10. In FIG. 2*a* it can be seen that the flanks 14 of the chip formers 6, 7, 8, 9, 10 can be connected to each other by way of convex and concave curved portions. In an advantageous embodiment of the invention it is provided that the chip formers 6, 7, 8, 9, 10 are formed with flanks 14 of a flat shape with inclination angle α (bold line in FIGS. 2*c* and 2*d*). Of course, alternatively, the chip formers 6, 7, 8, 9, 10 can be formed with flanks 14 of a curved shape with curvature radius R (thin lines in FIGS. 2*c* and 2*d*).

Figure 2B:
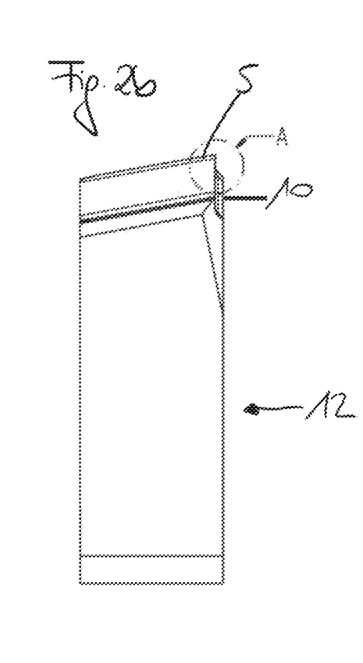
Figure 2C:
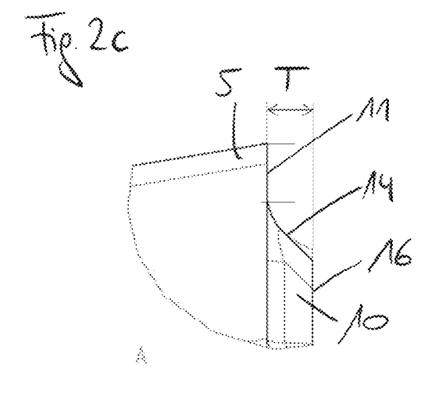
Figure 2D:
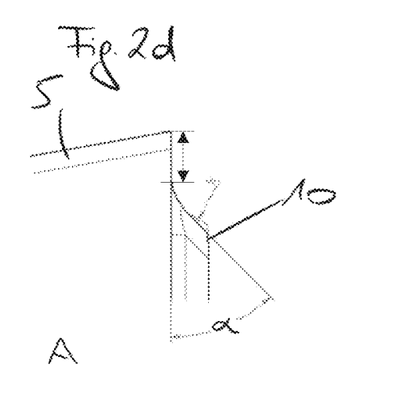

In FIG. 2*b*-*d* it can be seen that the thread cutting insert 12 is provided with a positive clearance angle.

FIG. 2*c* shows in a plane perpendicular to the rake face 11 a detail of the chip former 10 allocated to the fifth cutting tooth 5 in which it can be seen (shown in bold lines) that an inclined flank of the chip former 10 connects to the rake face 11 by way of a portion having a connecting radius. The connection radius allows to have a smooth transition between the rake face 11 and the flank 14 of the chip former 10. An alternative contour of the chip former 10 is shown in thin lines having a curved flank 14. In case the flank 14 is curved, the radius of curvature R of the flank 14 does not have to be the same as the radius of curvature of the portion having a connecting radius. Some or all of the flanks of all the chip formers 6, 7, 8, 9 can have one of the shapes shown in FIGS. 2*b* and 2*c* for chip former 10.

In FIG. 2*c* a thickness T of the chip former 10 is shown in a plane perpendicular to the rake face 11, the thickness T being defined by a distance between the rake face 11 and a top surface 16 of the chip former 10. All of the chip formers 6, 7, 8, 9, 10 can have the same thickness T but they can, alternatively, have different thicknesses T.

In case the thickness T of at least two chip formers 6, 7, 8, 9, 10 is different, the thickness T at the position of each chip former 6, 7, 8, 9, 10 is being defined by a distance between the rake face 11 and the top surface 16 at the position of the respective chip former 6, 7, 8, 9, 10. In this case the top surface 16 would not be a flat face parallel to the rake face 11.

Figure 3:
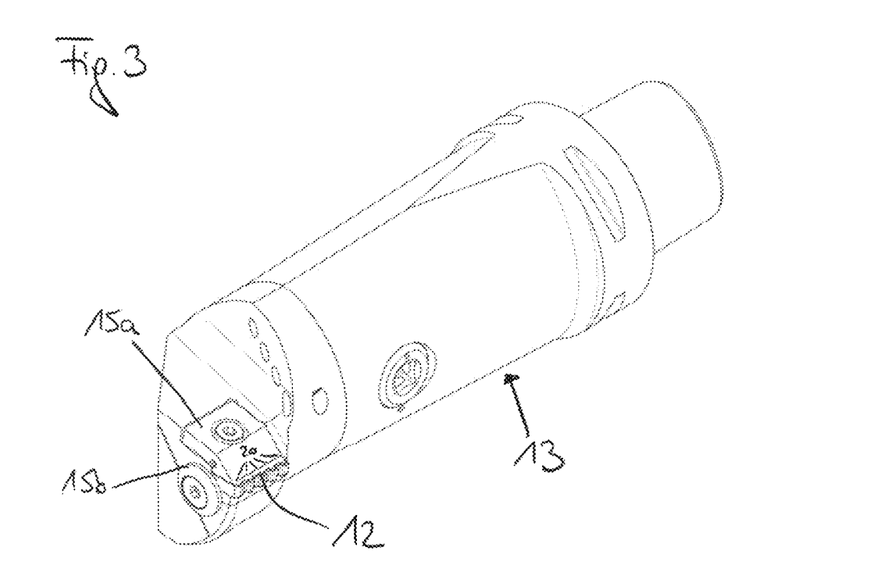

FIG. 3 shows the thread cutting insert 12 of FIGS. 1 and 2 mounted to a holder 13 which is formed as known in the prior art. It can be seen that the thread cutting insert 12 is being fixed to the holder 13 by use of two clamps 15*a*, 15*b* one of which (clamp 15*a*) in this example is arranged on top of the thread cutting insert 12 and the other one of which (clamp 15*b*) is arranged on a side of the thread cutting insert 12. The two clamps 15*a*, 15*b* could be arranged at alternative positions. The clamp 15*a* arranged on top has channels 20 through which cooling fluid can reach the cutting portion of the thread cutting insert 12.

Figure 4:
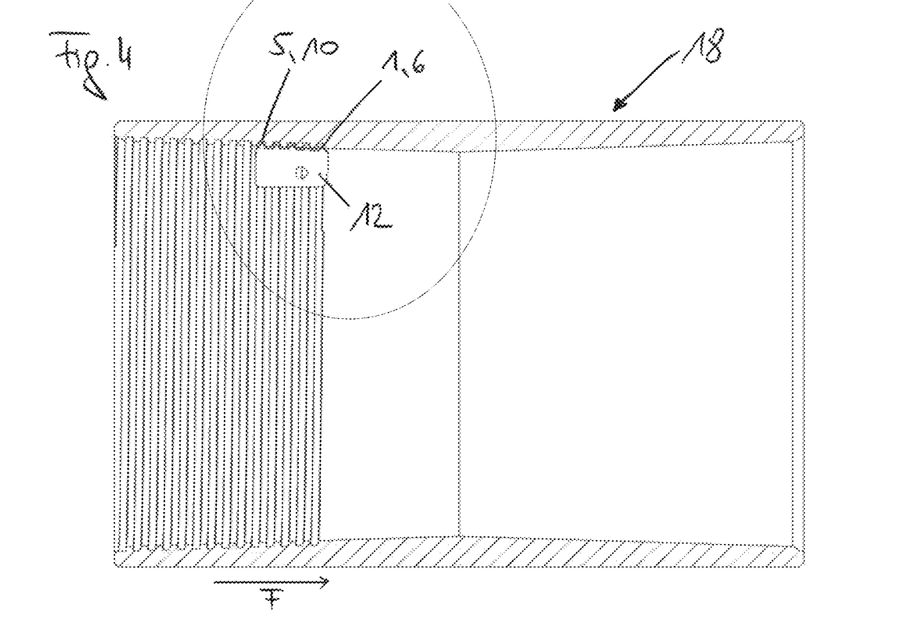

FIG. 4 shows a cross-section through a coupling 18 used to assemble two pipes or tubes which are threaded on their exterior (an example for such a pipe 19 can be seen in FIG. 5) in which a cutting operation using the thread cutting insert 12 of FIGS. 1 and 2 is in progress. Feed direction F is to the right. Part of a thread has already been cut into an interior surface of the coupling 18 on the left side of the coupling 18. A thread on the interior surface of the coupling 18 on the right side of the coupling 18 can be cut using the thread cutting insert 12 in a separate operation. A holder 13 to which the thread cutting insert 12 is mounted is not shown (but cf. FIG. 3). In this embodiment, the shape of the chip former 6 allocated to the first cutting tooth 1 is chosen to take account of a tapering of the interior surface of the coupling 18. The tapering means that the so-called pitch line of the thread is not parallel to the workpiece (here: coupling 18) longitudinal axis but is inclined to it by the taper angle. The pitch line generally is defined as an element of the imaginary cylinder (for straight threads) or cone (for tapered threads), which, in the general terminology for screws and threads, are used to define a pitch diameter. The pitch diameter is the diameter of a cylindrical surface (cylinder or cone), axially concentric to the thread, which intersects the thread flanks at equidistant points, when viewed in a cross-sectional plane containing the axis of the thread, the distance between these points being exactly one half the pitch distance.

Figure 5:
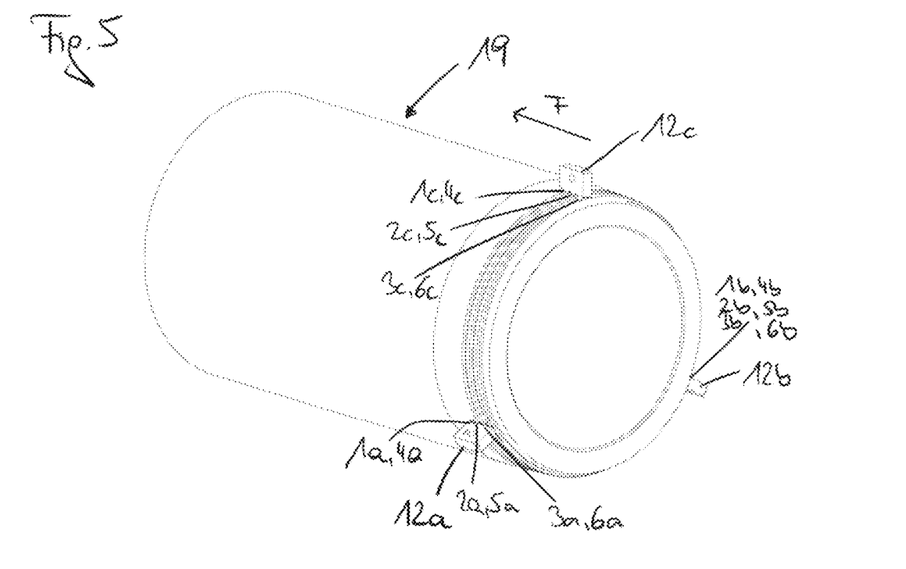

FIG. 5 shows a pipe 19 in which a set of three thread cutting inserts 12*a*-*c* (each thread cutting insert 12*a*-*c* having three cutting teeth 1*a*-*c*, 2*a*-*c*, 3*a*-*c*) is used to cut a thread on an exterior surface of the pipe 19, each thread cutting insert 12*a*-*c* having a plurality of cutting teeth 1*a*-*c*, 2*a*-*c*, 3*a*-*c* wherein each cutting tooth 1*a*-*c*, 2*a*-*c*, 3*a*-*c* is provided with an allocated chip former 4*a*-*c*, 5*a*-*c*, 6*a*-*c*, the chip formers 4*a*-*c*, 5*a*-*c*, 6*a*-*c* being provided on a rake face 11*a*-*c* of the respective thread cutting insert 12*a*-*c*. Other than shown, the three thread cutting inserts 12*a*-*c* do not have to be equally spaced around the circumference of the pipe 19. In this embodiment, the shape of the chip former 4*a* allocated to the first cutting tooth 1*a* on the first thread cutting insert is chosen to take account of a tapering of the exterior surface of the pipe 19.

E. g., the cutting tooth 1*b* arranged on the second thread cutting insert 12*b* which in operation is the second cutting tooth 1*b* to engage the pipe 19 could be formed in the same way as the second cutting tooth 2 of the single thread cutting insert 12 of FIGS. 1 and 2, the cutting tooth 1*c* arranged on the third thread cutting insert 12*c* which in operation is the third cutting tooth 1*c* to engage the pipe 19 could be formed in the same way as the third cutting tooth 3 of the single thread cutting insert 12 of FIGS. 1 and 2, and so on.

The thread cutting inserts 12*a-c* are to be mounted to holders (not shown, but each holder can be designed in the same way as the holder 13 shown in FIG. 3) such that in order of their engagement during cutting operation cutting teeth 1*a-c*, 2*a-c*, 3*a-c* arranged on different thread cutting inserts 12*a-c* follow each other in operation. The shape of at least two cutting teeth 1*a-c*, 2*a-c*, 3*a-c* is different from each other. Each of the cutting teeth 1*b-c*, 2*a-c*, 3*a-c* of a specific thread cutting insert 12*a-c* is provided with an allocated chip former 4*b-c*, 5*a-c*, 6*a-c* the shape of which essentially corresponds to the shape of that cutting tooth 1*a-c*, 2*a-c*, 3*a-b* which is arranged on a thread cutting insert 12*a-c* that in operation precedes the specific thread cutting insert 12*a-c* with respect to order of their engagement during cutting operation such that chip formers 4*b-c*, 5*a-c*, 6*a-c* allocated to a cutting tooth 1*b-c*, 2*a-c*, 3*a-c* being subsequent to the first cutting tooth 1*a* has a shape adapted to the cross-section of chips encountered by it.

Figure 6:
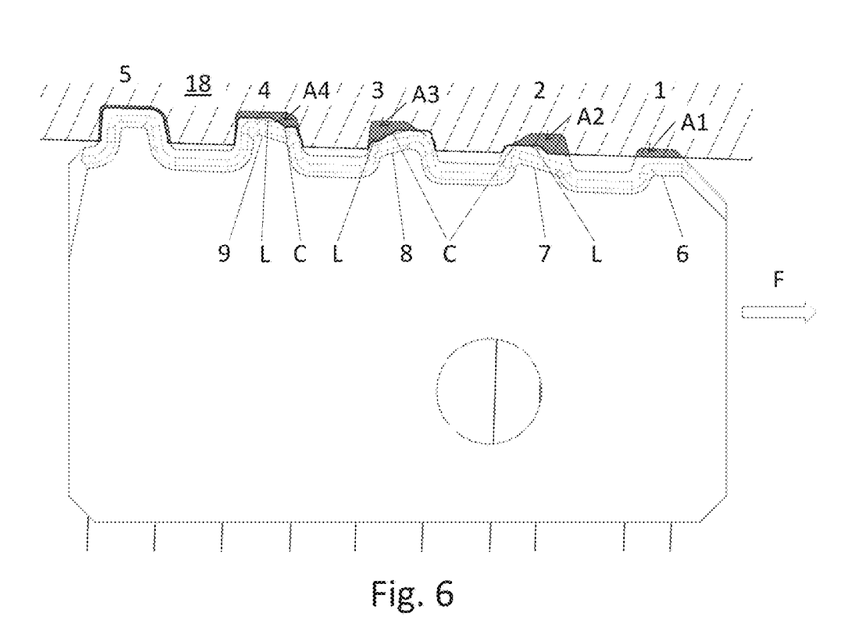

FIG. 6 gives a detailed view of the threading action shown in FIG. 4. The dashed lines depict the material of the wall of the pipe 18, the insert feed direction F is indicated by an arrow. In the present example the material to machined is tapered and the insert is adapted to the tapering.

As shown in previous FIG. 4, all cutting teeth are in contact with the material to be cut and it can be understood that each subsequent cutting tooth further cuts the groove already cut by the previous teeth. The grey shaded area is the cross-section of the resulting chips. The bold solid line shows the contour C of the previous cutting tooth/teeth.

As can be seen on the example of the subsequent teeth 1 through 4, the first tooth 1 removes a chip with a cross-section area A1.

For the rightmost cutting tooth (cutting tooth 1, see also in FIGS. 1 and 2) the cross-section A1 is simply given by the shape of this cutting tooth in conjunction with the shape of the uncut material.

For the cutting tooth next in line (second cutting tooth 2) it can be seen that the cross-section A2 is larger in the right area than in the left area of the groove because the shape of the first cutting tooth 1 is such that it only cut in the left area in addition to cutting tooth 2 being truncated on its left side.

The subsequent tooth 2 removes a chip with a cross-section area A2. The chip cross-section A2 corresponds to the shape of the tooth 2 minus the cross-section area that has already been removed by the previous tooth 1, as indicated by the contour C.

As can be seen from FIG. 6, the chips may not be uniform with respect to their cross-section thickness, but that their thickness may vary along the breadth. This is due to the fact that the shapes of subsequent teeth are geometrically not similar. It is noted that not necessarily all pairs of subsequent teeth are dissimilar in their shapes. It is preferred, however, that at least one pair of subsequent teeth are dissimilar in their shapes. The resulting non-uniform chip cross-section is beneficial for chip evacuation. Further, the inventive concept works best for a sequence of dissimilar tooth shapes, as the adaption of the chip formers the is fully employed. It can be foreseen, for example, that the tooth shapes of the last two teeth ("last" with respect to their order of engagement) is similar, as shown for teeth 4 and 5 in the present example. It is preferred, that at least a pair of subsequent teeth are dissimilar in shape, resulting in non-uniform chips cross-section thicknesses. For example, the cross-section A2 is larger in the right area than in the left area of the groove, as the cutting tooth 2 is dissimilar to the preceding tooth 1.

When now drawing a regression line L (e.g. by linear least squares) of this contour C, corresponding to the chip formation area's chaser-side boundary of an individual tooth, one obtains the dash-dotted line indicated in FIG. 6. In other words, this dash-dotted regression line L represents the linear approximation of that chip boundary portion that has been created by the foregoing teeth plus possibly the chaser-side shape of the uncut material. In other words, the regression line represents the linear approximation of the course of the total chaser-side boundary of the chip created by the respective tooth. This chaser-side boundary may be made up solely by the contour of the foregoing tooth, when the subsequent tooth is laterally of the same or less width as the foregoing tooth. If the subsequent tooth, however, laterally is wider than the foregoing tooth, the chip boundary portion consists of a portion created by the foregoing teeth plus the chaser-side portion of uncut material, as shown for example for tooth 2 in FIG. 7*a*.

As can be seen, the slant of the respective chip formers 7, 8 etc. is essentially parallel, preferably parallel to the respective regression line L per tooth. In that way, an allocated chip former 7, 8, 9, 10 is adapted to the shape of that cutting tooth 1, 2, 3, 4 which with respect to an order of engagement during cutting operation precedes the subsequent cutting tooth 2, 3, 4, 5 along the cutting portion.

If the chip former 7 allocated to the second cutting tooth 2 was not adapted to the shape of the first cutting tooth 1 in such a way that it is adapted to the shape of the cross-section of the chip encountered by it, but would be of the same shape as the cutting tooth 2, there would be too little space for the chip in the right area of the groove which would result in a higher cutting force because the chip will be squeezed by the chip former in this area.

As can be seen from FIG. 6 (and also from previous FIGS. 1 and 2), the chip former 7 allocated to the second cutting tooth 2 is in fact adapted to the cross-section of the chip because it leaves more space for the chip in the right area. The same holds true for the chip formers 8 and 9 allocated to the third and fourth cutting teeth 3, 4. It can also be seen that it is not necessary for a chip former to be of the exact same shape as the cross-section of the chip, it is sufficient that it is essentially of the same shape. For example, it is easier to produce chip formers with linear contours, therefore the shape of the chip formers follows the simplified course indicated by the regression lines discussed above.

It shall be emphasized that the above can be derived by the skilled person from FIG. 4 alone. In particular, the skilled person knows how the insert enters into the material and thus how the chips are formed. The skilled person also well understands the meaning of "a chip former has a shape adapted to the cross-section of chips encountered by it", e.g. for a thick chip the distance d between the cutting edge and the chip former should be chosen larger than for a thin chip.

Figure 7A:
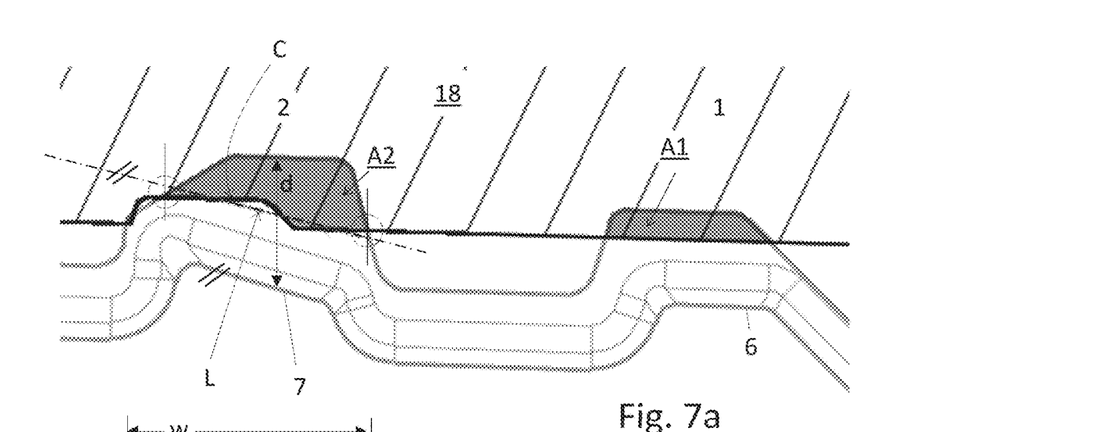
FIG. 7a-b detailed views of cutting teeth A.

FIG. 7*a* shows a magnified cut-out from FIG. 6 for an even better visualization of geometric features. In FIG. 7*a* only teeth 1 and 2 are shown in their engagement into the material 18. The explanations given in the following are not limited to teeth 1 and 2 but are applicable to other teeth as well.

Figure 7B:
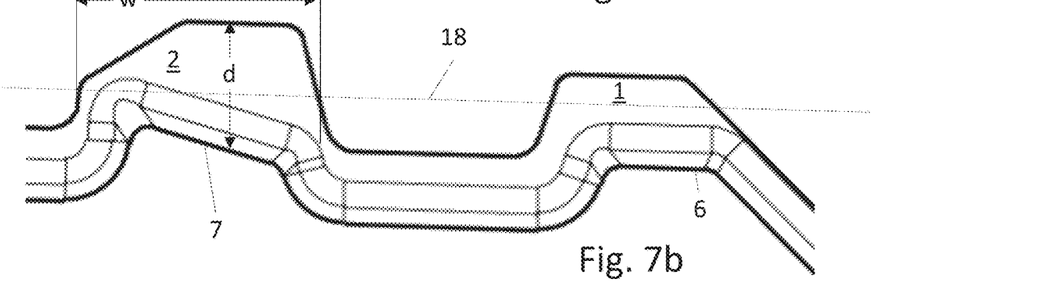

The cutting situation depicted in FIG. 7a is further illustrated by FIG. 7b showing a magnified cut-out from FIG. 2a.

FIG. 7b also only shows the two teeth 1 and 2 of FIG. 7a, that is, the same teeth but not engaged-into material. Each tooth has a certain width (lateral breadth) w. A dotted line indicates the surface of the material 18 to be threaded.

As explained above for FIG. 6, the chip cross-section area A2 results from the superposition of the chip cross-section area A1 (removed by the previous tooth 1) and the shape of the following tooth 2. A chip cross-section area is defined on the one hand by a chaser-side boundary line given by the contour C of the preceding tooth, and on the other hand by the contour line of the cutting edge of the respective tooth ("material side").

In the magnified view of FIG. 7a, the dash-dotted regression line L is drawn, which is derived from a linear regression of the chaser-side boundary line of the resulting chip. The starting and end points of the chaser-side boundary line are highlighted by auxiliary circles. Those points correspond to the positions where the respective tooth actually enters the material 18.

The regression line L can be defined as the line resulting from the linear regression of the contour C between the two entering points highlighted by auxiliary circles. As can be seen in top view, the slant of the corresponding chip former 7 essentially follows (is parallel to) the regression line L.

It must be understood that given the curved nature of the chip former, of course not the whole chip former 7 follows (is parallel to) the regression line L, but at least a portion of the chip former 7, namely its straight portion facing the cutting edge, see the "parallel" symbols in FIG. 7a.

Such, the allocated chip former 7 is adapted to the shape of the previous cutting tooth 1, or, to put more precisely, the slant of the chip former 7 is adapted to the course of the chaser-side chip contour resulting from the engagement of the following tooth 2 in the groove formed by the previous tooth 1.

By this measure, the shape of the chip former considers the material already removed by the foregoing tooth.

The—above concerns the slope (slant) of the chip former in a top view.

This preferred design of the chip former may be realized for at least one chip former or a plurality of chip formers on an insert.

In a further step, the distance d between a cutting edge and the related chip former is adjusted according to a chip thickness encountered. For a thick chip the distance should be chosen larger than for a thin chip. The resulting chip thickness can easily be derived from the geometric relationships between two subsequent teeth. The chip cross-section thickness can be seen from the cross-section area A2, in the present example.

As can be seen in FIGS. 7a and 7b, the distance d is larger at positions with a thicker chip than at positions that encounter a thinner chip. Such, the at least one chip former 7, 8, 9, 10 has a shape adapted to the cross-section of chips encountered by it. Preferably, the cutting insert is designed such, that a distance d between a cutting edge and the related chip former 7, 8, 9, preferably with respect to all of the chip formers, is adjusted to a chip thickness encountered by the corresponding portion of the cutting edge such that the distance d is chosen larger for those positions that encounter a thicker chip than for those positions that encounter a thinner chip.

The explanation above is given functionally by way of engagement of the cutting teeth into material. It is, however, just as well possible to specify the features of the inventive cutting insert purely structurally, as shall be shown by way of FIGS. 8a and 8b.

Figure 8A:
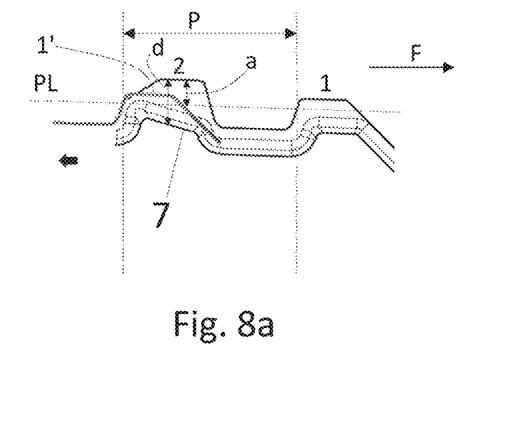
FIG. 8a-c details of cutting teeth

FIG. 8a shows a section of the cutting insert already discussed in the previous figures. FIG. 8c shows the insert as a whole for definition of the relevant directions. The intended feed direction F corresponds to an axial direction of the cutting insert. A direction perpendicular to the feed or axial direction can be defined as radial direction RD.

FIG. 8a now illustrates an (imaginary) superposition of two subsequent cutting teeth, in the present example the cutting teeth 1 and 2. For sake of clarity the virtually shifted tooth 1 is designated "1'". This imaginary superposition is effected by a translational displacement along the axial direction of the cutting insert by one pitch length P of the cutting insert. The pitch is defined as the distance from a point on a screw thread to a corresponding point on the next thread measured parallel to the axial direction of a thread. It shall be noted that when the cutting insert is adjusted for tapered work pieces, as the case in the present example, the imaginary translational displacement for achieving the superposition shall be performed along, that is parallel to the taper (i.e. the so-called pitch line PL). When there is no taper, the pitch line PL is parallel to the axial direction of the cutting insert. As can be seen in the figure, cutting tooth 1 is shifted along the pitch line PL towards the subsequent tooth 2, which in operation follows tooth 1. The relative shift direction leading to the superposition is denoted by a black block arrow. In other words, the superposition is achieved by virtually projecting cutting tooth 1 over the subsequent cutting tooth 2.

It is now possible to draw a radial cutting edge distance—a—between the contours, that is, between the cutting edges of the superimposed teeth 2 and 1'. Further, a radial chip former distance d, that is, the radial distance between the cutting edge and the chip former, describes the course of the respective chip former 7 of tooth 2. All measures given as seen from the top view.

In the most generic case of above described principle, the superposition is formed by the sum of all foregoing cutting edges. In terms of set theory, the superposition marks the union (German: Vereinigungsmenge) of the contours of all foregoing cutting edges.

The radial cutting edge distance—a—then is defined as the radial distance between the envelope (in terms of geometry) of the superposition of the foregoing cutting edges and the cutting edge of the actual cutting tooth.

The superposition, as can easily be understood, is effected by shifting the individual cutting edge contours by their respective distance from the actual cutting tooth. Their distance may be expressed in pitch lengths P. For the sake of an example, by way of FIG. 8c, it could be conceived that for an superposition of cutting teeth 1 through 4, cutting tooth 1 is virtually shifted by four times the pitch length P to be projected over cutting tooth 5, cutting tooth 2 is virtually shifted by three times the pitch length P to be projected over cutting tooth 5, cutting tooth 3 is virtually shifted by two times the pitch length P to be projected over cutting tooth 5, cutting tooth 4 is virtually shifted by one pitch length P to be projected over cutting tooth 5, each along the pitch line PL.

As can be seen, the cutting insert preferably is designed-such that—at least partially the radial chip former distance—d—of the respective chip former with respect to the cutting edge is chosen larger at axial positions where the radial cutting edge distance —a—is larger than at positions where the radial cutting edge distance—a—is smaller. In this way, the chip former is adapted to the chip encountered by it.

Preferably, above design is realized for several or all cutting teeth 2, 3, 4, 5.

In a preferred embodiment, the radial distance d of the respective chip former is, at least partially, substantially linearly proportional to the radial cutting edge distance a.

It shall be noted that the above discussed design criterion is equally valid for a set of cutting inserts where the principle is just realized on separate inserts. That is, in the case of a set, subsequent (in order of engagement) teeth are not on the same physical insert but on distanced cutting inserts.

The concept of superposition of foregoing cutting edges contours to form an envelope and to adjust the actual radial chip former distance—d—of the respective chip former in dependence of the radial cutting edge distance—a—can equally be applied for a method for cutting threads.

Figure 8B:
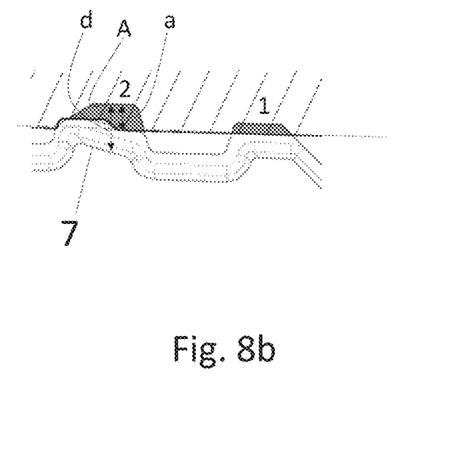
Figure 8C:
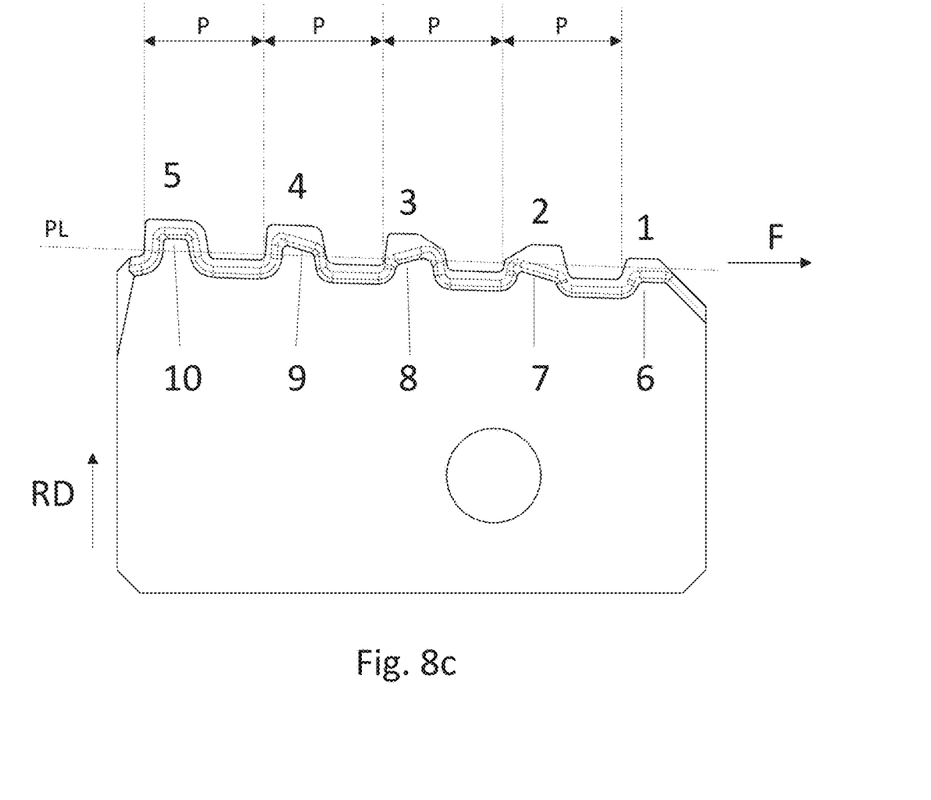

FIG. 8b gives an alternative representation of the above described design criterion while the cutting insert is shown in operation. The shaded area A represents the cross-section thickness of the chip created by the respective cutting tooth 2. It can be seen that through the above described preferred course of the chip former 7, the chip former is adapted to the chip encountered by it.

As discussed above with respect to the embodiments shown in the Figures, the inventive concept can be realized either with a single thread cutting insert 12 or a set of at least two thread cutting inserts 12a-c.

Protection is further sought for a method for cutting threads, wherein at least one thread cutting insert or a set of thread cutting inserts is employed such that a cutting tooth 1, 2, 3, 4 with respect to the order of engagement is followed by a cutting tooth 2, 3, 4, 5 with a chip former 7, 8, 9, 10 the shape of which chip former is adapted to the shape of the respective preceding cutting tooth 1, 2, 3, 4 such that the shape is adapted to the cross-section of chips encountered by it.

Preferably, the shape of chip former 7, 8, 9, 10 being describable by its radial distance—d—from the cutting edge of the respective cutting tooth 2, 3, 4, 5 is chosen such that in an imaginary superposition of two with respect to their order of engagement subsequent cutting teeth a radial distance—a—can be defined between the contours of superimposed cutting teeth, wherein the radial distance—d—of the respective chip former 7, 8, 9, 10 is chosen larger at axial positions where the radial distance—a—is larger than at positions where the radial distance—a—is smaller.

LIST OF REFERENCE SIGNS 1 cutting tooth on single thread cutting insert
2 cutting tooth on single thread cutting insert
3 cutting tooth on single thread cutting insert
4 cutting tooth on single thread cutting insert
5 cutting tooth on single thread cutting insert
6 chip former on single thread cutting insert
7 chip former on single thread cutting insert
8 chip former on single thread cutting insert
9 chip former on single thread cutting insert
10 chip former on single thread cutting insert
1a-c cutting tooth on first to third thread cutting insert
2a-c cutting-tooth on first to third thread cutting insert
3a-c cutting tooth on first to third thread cutting insert
4a-chip former on first to third thread cutting insert
5a-c chip former on first to third thread cutting insert
6a-c chip former on first to third thread cutting insert
11 rake face of thread cutting insert
11a-c rake face on first to third thread cutting insert
12 single thread cutting insert
12a-c first to third thread cutting inserts
13 holder for thread cutting insert
14 flank of a chip former
15a, 15b clamps for thread cutting insert
16 top surface of chip former
17 hole for cooling fluid
18 coupling
19 pipe
20 channels for cooling fluid
a radial cutting edge distance (radial distance between superimposed cutting edges)
C contour of material to be cut
d radial chip former distance (radial distance between a cutting edge and the related chip former)
F feed direction
H height of chip former
L regression line
PL Pitch line direction
R radius of curvature of flank of chip former
RD radial direction
T thickness of chip former
w tooth width (lateral breadth)
α inclination angle of flank of chip former

The invention claimed is:

1. A thread cutting insert for cutting threads, the thread cutting insert comprising:
   a rake face of the thread cutting insert;
   a plurality of cutting teeth disposed along a cutting portion, at least two of said cutting teeth having shapes differing from each other;
   allocated chip formers each associated with a respective one of said plurality of cutting teeth, said chip formers being provided on said rake face;
   said allocated chip former associated with at least one of said cutting teeth along said cutting portion having a shape adapted to a shape of one of said cutting teeth which, with respect to an order of engagement during a cutting operation, precedes a subsequent cutting tooth along said cutting portion such that said at least one chip former has a shape adapted to a cross-section of chips encountered by it;
   said chip former extending with a variable radial chip former distance with respect to a cutting edge, in an imaginary superposition of all foregoing cutting edges with an actual cutting tooth, said imaginary superposition of cutting edges forming an envelope;
   a radial cutting edge distance being definable as a radial distance between said envelope of said imaginary superposition of foregoing cutting edges and said cutting edge of an actual cutting tooth; and
   at least a portion of said chip former being parallel to a regression line, said regression line representing a linear approximation of a course of a total insert-side boundary of a chip to be created by said actual cutting tooth.

2. The thread cutting insert according to claim 1, wherein each of said cutting teeth being subsequent to a first cutting tooth is provided with an allocated chip former having a shape adapted to a shape of that cutting tooth which, with respect to an order of engagement during a cutting operation, precedes said subsequent cutting tooth along said cutting portion such that each chip former allocated to a cutting tooth being subsequent to said first cutting tooth has a shape adapted to a cross-section of chips encountered by it.

3. The thread cutting insert according to claim 1, wherein a sequence of adjacent teeth of said plurality of cutting teeth has truncated cutting teeth, and truncations of subsequent truncated teeth are disposed on alternating sides of said cutting teeth.

4. The thread cutting insert according to claim 1, wherein at least one of heights or widths of said cutting teeth along said cutting portion increase with respect to an order of engagement during a cutting operation.

5. The thread cutting insert according to claim 1, which further comprises a number of cutting teeth along said cutting portion being equal to three or twelve or lying between three and twelve.

6. The thread cutting insert according to claim 1, which further comprises a number of cutting teeth along said cutting portion being equal to three or six or lying between three and six.

7. The thread cutting insert according to claim 1, which further comprises, within said plurality of cutting teeth, a sequence of at least two adjacent teeth with allocated chip formers, said chip former of a subsequent cutting tooth of said sequence, with respect to an order of engagement during a cutting operation, having a shape being a mirror image shape of said chip former of a preceding cutting tooth.

8. The thread cutting insert according to claim 1, wherein said chip formers are provided as elevations disposed on said rake face of the thread cutting insert.

9. The thread cutting insert according to claim 1, wherein said chip formers are distanced from a cutting edge of said cutting portion or a portion of at least one of said chip formers reaches said cutting edge of said cutting portion.

10. The thread cutting insert according to claim 1, wherein said chip formers are provided with flanks having a flat or curved shape.

11. The thread cutting insert according to claim 10, wherein an inclination angle or a curvature of said flank of said chip former changes along an extension of said chip formers.

12. The thread cutting insert according to claim 1, wherein at least a pair of subsequent cutting teeth have geometrically dissimilar shapes.

13. A thread cutting tool, comprising:
a holder; and
the thread cutting insert according to claim 1 being mounted to said holder.

14. A method for cutting threads, the method comprising:
providing at least one thread cutting insert according to claim 1 or a set of thread cutting inserts each having a cutting tooth followed by another cutting tooth with respect to an order of engagement, and a chip former having a shape adapted to a shape of a respective preceding cutting tooth such that the shape is adapted to a cross-section of chips encountered by it.

15. The method according to claim 14, wherein the shape of the chip former describable by its radial chip former distance from a cutting edge of a respective cutting tooth is chosen such that in an imaginary superposition of at least two subsequent cutting teeth, with respect to their order of engagement, a radial cutting edge distance can be defined between the contours of superimposed cutting teeth, and the radial chip former distance of the respective chip former is chosen larger at axial positions where the radial cutting edge distance is larger than at positions where the radial cutting edge distance is smaller.

* * * * *